(12) United States Patent
Amintafreshi

(10) Patent No.: US 8,990,774 B2
(45) Date of Patent: Mar. 24, 2015

(54) METHODS AND APPARATUS FOR AUTOMATIC TESTING OF A GRAPHICAL USER INTERFACE

(75) Inventor: Mehrvarz Amintafreshi, Solna (SE)

(73) Assignee: Cinnober Financial Technology AB, Stockholm (SE)

( * ) Notice: Subject to any disclaimer, the term of this patent is extended or adjusted under 35 U.S.C. 154(b) by 217 days.

(21) Appl. No.: 13/513,461

(22) PCT Filed: Nov. 30, 2010

(86) PCT No.: PCT/IB2010/003215
§ 371 (c)(1),
(2), (4) Date: Jun. 1, 2012

(87) PCT Pub. No.: WO2011/073759
PCT Pub. Date: Jun. 23, 2011

(65) Prior Publication Data
US 2012/0243745 A1    Sep. 27, 2012

Related U.S. Application Data

(60) Provisional application No. 61/265,609, filed on Dec. 1, 2009.

(51) Int. Cl.
*G06F 9/44*      (2006.01)
*G06F 3/00*      (2006.01)
*G06F 11/36*     (2006.01)

(52) U.S. Cl.
CPC ........ *G06F 11/3688* (2013.01); *G06F 11/3692* (2013.01)
USPC ........... 717/124; 717/125; 717/128; 717/131; 715/772

(58) Field of Classification Search
CPC ....................................... G06F 11/36
See application file for complete search history.

(56) References Cited

U.S. PATENT DOCUMENTS 5,475,843 A * 12/1995 Halviatti et al. .............. 717/124
5,596,714 A   1/1997 Connell (Continued)

OTHER PUBLICATIONS

Ellis Horowitz et al., "Graphical User Interface Testing", [Online], 1993, pp. 1-20, [Retrieved from Internet on Dec. 21, 2014], <http://www.cs.usc.edu/assets/004/83252.pdf>.*

(Continued)

*Primary Examiner* — Thuy Dao
*Assistant Examiner* — Ziaul A Chowdhury
(74) *Attorney, Agent, or Firm* — Piedmont Intellectual Property

(57) ABSTRACT

Methods and apparatus in a computer for automatically testing computer programs involve opening a predefined graphical user interface (GUI) on a screen of the computer; loading a set of program script instructions from a script database in communication with the computer that is associated with the predefined GUI; reading a loaded set of program script instructions; retrieving, based on the loaded set, data and at least one image object corresponding to the predefined GUI from a data and image object database in communication with the computer; taking a screenshot of the predefined GUI that includes at least one image object of the predefined GUI; determining whether an image object in the screen shot matches an image object retrieved from the data and object image database; and if a target position on the screen of the matching image object based on data retrieved from the data and image object database, and activating a control function adapted to control the predefined GUI based on the loaded set of program script instructions and the target position.

19 Claims, 10 Drawing Sheets

(56) References Cited

U.S. PATENT DOCUMENTS

| | | | |
|---|---|---|---|
| 8,392,886 B2* | 3/2013 | Sweis et al. | 717/125 |
| 8,392,887 B2* | 3/2013 | Nagle | 717/125 |
| 8,607,152 B2* | 12/2013 | McMahan et al. | 715/772 |
| 2004/0230954 A1* | 11/2004 | Dandoy | 717/124 |
| 2005/0204343 A1* | 9/2005 | Kisamore et al. | 717/124 |
| 2006/0279571 A1 | 12/2006 | Mori et al. | |
| 2008/0127095 A1* | 5/2008 | Brennan et al. | 717/124 |
| 2008/0133472 A1* | 6/2008 | Patterson | 707/3 |
| 2009/0217302 A1* | 8/2009 | Grechanik et al. | 719/320 |
| 2009/0217303 A1* | 8/2009 | Grechanik et al. | 719/320 |
| 2010/0229112 A1* | 9/2010 | Ergan et al. | 715/764 |
| 2011/0047488 A1* | 2/2011 | Butin et al. | 715/762 |
| 2011/0214107 A1* | 9/2011 | Barmeir et al. | 717/125 |
| 2012/0317549 A1* | 12/2012 | Cunningham et al. | 717/128 |
| 2014/0237455 A1* | 8/2014 | Koneru et al. | 717/131 |

OTHER PUBLICATIONS

Ishan Banerjee et al., "Graphical user interface (GUI) testing: Systematic mapping and repository", [Online], 2013, pp. 1679-1694, [Retrieved from Internet on Dec. 21, 2014], <http://cgis.cs.umd.edu/~atif/papers/ISTSurvey2013.pdf>.*

Chaitanya Kallepalli et al., "Measuring and Modeling Usage and Reliability for Statistical Web Testing", [Online], 2001, pp. 1023-1036, [Retrieved from Internet on Dec. 21, 2014], <http://ieeexplore.ieee.org/stamp/stamp.jsp?tp=&arnumber=965342>.*

Ying-Dar Lin et al., " On the Accuracy of Automated GUI Testing for Embedded Systems", [Online], 2013, pp. 1-16, [Retrieved from Internet on Dec. 21, 2014], <http://speed.cis.nctu.edu.tw~ydlin/pdf/AccuracyTest-SPAG-minor_revision_final.pdf>.*

EPO, Int'l Search Report in PCT/IB/003215, Apr. 8, 2011.

EPO, Written Opinion in PCT/IB/003215, Apr. 8, 2011.

EPO, Int'l Prelim. Report on Patentability in PCT/IB/003215, Feb. 3, 2012.

T. Yeh et al., Sikuli: Using GUI Screenshots for Search and Automation, Proc. 22nd ACM Symposium on User Interface Software and Technology, Oct. 4, 2009, pp. 183-192.

Ranorex.Net, FindImage Method (imageFileName, foundLocation), RanorexNet Documentation, Mar. 9, 2011, p. 1, www.ranorex.com/Documentation/Net/html/M_Ranorex_Control_FindImage_2.htm.

* cited by examiner

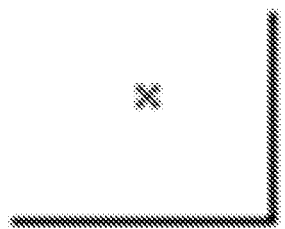
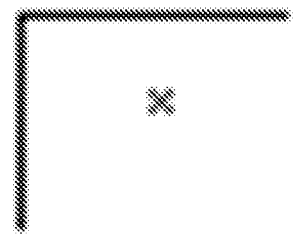
FIG. 4D     FIG. 4E
FIG. 4F     FIG. 4G
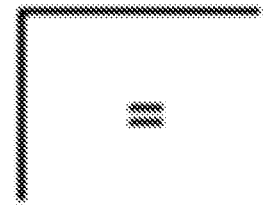
FIG. 4H     FIG. 4I
FIG. 4J

METHODS AND APPARATUS FOR AUTOMATIC TESTING OF A GRAPHICAL USER INTERFACE

TECHNICAL FIELD

The present invention generally relates to the field of computer systems and more particularly to nodes, computer program products, and methods for automatic regression testing of computer programs.

BACKGROUND

A computer system is tested several times over the course of its life cycle, starting with the computer program initial design and being repeated every time the computer system is modified. Testing of computer systems (e.g., software/computer program) is usually conducted by a test engineer who identifies defects by manually running a product through a defined series of steps and observing a result after each step. The testing has become a time consuming and extremely expensive process because the series of steps are intended to both thoroughly exercise product functions as well as re-execute scenarios that have identified problems.

A known method for computer program testing is regression testing by which is meant going back to earlier performed tests and doing them again to control a developing computer program's behavior such that it is unchanged from a last testing occasion. A current test result must be identical to a last recorded result. Regression testing can also be seen as any type of computer program testing that seeks to uncover regressions, or any type of software testing that seeks to find side effects. Side effects may be that when a bug itself is fixed the fix then might create other bugs. Fixing a minor bug may result in a major side effect and a bug fix for a high severity defect may have no or just a minor side effect. By regression it is usually meant a return to a former, usually (or generally) worse condition. As an example, such regressions occur whenever a previously working computer program functionality stops working as it should. Typically, regressions occur due to unintended program changes.

Existing well known methods of regression testing include rerunning previously run tests and evaluating whether previously fixed faults have re-emerged, i.e., repeat to happen. Usually hundreds of tests are performed to ensure that old features of a computer program are intact. Success in regression testing relies on regressions being found, isolated, and corrected quickly, in order to prevent code instabilities from aggregating and leading to quality deficiencies.

Experience has shown that as a computer program is corrected, emergence of new and/or reemergence of old faults are/is quite common. Correcting a fault in one area inadvertently might cause a computer program fault in another area. In addition, it has often been the case that when some feature is redesigned, the same mistakes that were made in the original implementation of the feature were made in the redesign as well.

Regression testing may be performed manually using programming techniques, e.g., by manually running specific tests recorded, or test use cases, to expose a certain fault. This may be done regularly by, for example, an administrator after subsequent changes to the computer program. Running such tests manually consumes a huge amount of time and resources. Thus, automation of regression testing may save money and time and increase the quality of the tested program, since testing may be determined to be performed immediately after a change is done to the computer program.

There are several existing technologies (automated systems, e.g., capture/replay tools, or robots) for automatic regression testing of computer programs, which allow a testing environment to execute all the regression testing automatically, which is to say without interaction with a human user. In some working areas, such as stock trading, automated systems are set up to automatically rerun some, or all, regression tests at specified time intervals and report any failures. These failures may further imply that there are one or more regressions in the computer program. Usually, automatic regression testing is performed once each night, or once every day.

Conventionally, automatic regression testing may be performed for tests at lower levels of integration (e.g., unit tests), but there is a need to automate all tests including all levels of integration (i.e., unit, integration, system, and acceptance testing). In general, a program is divided in several units where each unit might belong to a certain group of units. Each group is then associated with certain tests that should be used for regression testing of that group.

Grouping of units is typically performed based on unit characteristics. As an example, stock trading systems require high computer program quality and therefore it is considered important to be able to perform regression testing in such systems at all levels (e.g., trading clients, market management clients, system operation clients, etc.).

A drawback of the above-described automated systems is that they are sensitive to the technology used by clients. Some automated systems are dependent on a working operating system; other solutions are dependent on a system language; some of the known solutions are dependent on a web browser; some known solutions are not suitable, e.g., for certain programming languages; and, some known solutions simply cannot be easily maintained for regression testing.

Further to the above, regression tests are required to be very simple and reliable and therefore they are usually manually coded. An additional disadvantage with the existing automated systems for automatically regression testing is that a change in a computer program, a working progress, an interface of a computer program, or a test generally requires updating several tests stored in a test database. This means that huge amount of scripts need to be manually coded and updated upon a change in the computer program to be used when regression testing or when the computer program itself is tested. The change of such a computer program may for example be a change in a graphical user interface (GUI).

SUMMARY

An object of an exemplary embodiment of the present invention is thus to provide a method for automatic and flexible testing of a computer program based on analyses of a predefined GUI. According to an aspect of the invention, there is provided a method for automatically testing a computer program that includes analyzing a GUI by capturing and analyzing data and image objects of the GUI.

Also according to an aspect of the invention, there is provided a method in a node, such as computer, a server or a laptop, for automatically function-testing a computer program by opening a predefined GUI on a screen for the node; loading program script instructions from a script database that relates to the predefined GUI; reading loaded program script instructions; retrieving data and at least one image object corresponding to the predefined GUI from a data and image object database; taking a screenshot of the predefined GUI; determining whether an image object in the screen shot matches an image object retrieved from the data and object image database; calculating a target position on the screen of a matched image object based on data retrieved from the data and image object database; and activating a control function for controlling the predefined GUI based on the program script instructions and the calculated target position.

Also according to an aspect of the invention, there is provided a node for automatically testing a computer program by using a predefined GUI. The node includes a screen; a GUI controller circuit adapted to find and upload a predefined GUI onto the screen; a script database adapted to store program script instructions relating to the predefined GUI; a data and image object database adapted to store data and at least one image object corresponding to the predefined GUI; a data and object retriever circuit adapted to retrieve data and at least one image object corresponding to the predefined GUI from the data and image object database; a screen controller circuit adapted to take a screenshot of the predefined GUI; an analyzer circuit adapted to determine whether an image object in the screenshot matches a retrieved image object; a calculator circuit adapted to calculate a target position on the screen of a matched image object based on data retrieved from the data and image object database; and an activator circuit adapted to activate a control function to control the predefined GUI based on the program script instructions and the calculated target position.

Also according to an aspect of the invention, there is provided a method in a node for automatic regression testing a computer program. The method includes uploading a predefined GUI on a screen of the node, such as a server or laptop computer. This may be done directly after a system start-up. The method also includes loading program script instructions from a script database, reading loaded program script instructions, and retrieving data and at least one image object corresponding to the predefined GUI from a data and image object database, taking a screenshot of the predefined GUI and determining whether an image object in the screenshot matches a retrieved image object, calculating a target position on the screen of a matched image object based on data retrieved from the data and image object database, and activating a control function for controlling the predefined GUI based on the program script instructions and calculated target position. The method further includes starting a timer; taking a further screenshot of the predefined GUI, determining whether an image object in the further screen shot corresponds to an expected image object, which also may be retrieved from the data and image object database; determining whether the regression testing is finished; determining if there are more regression tests to be performed; and completing the regression testing by displaying at least one result on the screen.

According to a further aspect, the method in a node can further include storing information on failed tests and including the stored information in the displayed at least one result. The method in a node can further include saving an image of the predefined GUI resulting in a failed test, and reporting failure together with the displayed at least one result, e.g., as a link.

According to a further aspect, the method in a node according to any of the exemplary embodiments mentioned above may further comprise: waiting a predetermine period after the analyzing whether there is a matching image object equal to an expected result; adding the waited time period to a total passed time; comparing whether the total passed time exceeds a timing threshold set by the timer; and keep repeating taking the further screenshot of the predefined GUI until the analyzing of whether there is a matching image object equal to an expected result, is equal to the expected result or until the total passed time exceeds the timing threshold.

According to a further aspect, the method in a node can further include resetting all time clocks when the analyzing whether there is a matching image object equal to an expected result matches an object equal to the expected result, or before reporting failure. The method in a node can further include using mouse or keyboard control to activate the control function for controlling the predefined GUI based on the program script instructions and calculated target position. The method in a node can further include automatically taking down a computer program or a system when the regression test(s) are/is determined to be finished.

According to a further aspect, the method in a node can further include automatically starting up a computer program or a system when regression testing is set to start, i.e., time activation or initiated by a certain activity. The method in a node can further include calculating a target position of the matched image object using the retrieved data, where the target position is further used to define an input area to be used for input of information or instructions.

According to further aspects, data retrieved from the data and image object database includes position history data and/or target position data. The data and image object database includes a separate data database and an image object database, where each image object is coupled to specific data in the data database.

According to a further aspect of the invention, the method in a node can further include calculating a target position of a matched image object using retrieved data that include history data and/or target position data, where the history data defines a relative point on the screen, such as one or more previously recorded positions of the image object on the screen. The method in a node can further include using the data and image object retrieved from the data and image object database to match and locate a target image object on a screen comprising a GUI.

According to a further aspect of the invention, there is provided a computer program product that, when run on a computer, causes the computer to perform a method as described in this application.

An advantage of the methods and apparatus in accordance with this invention is that the time for performing tests of computer programs is reduced. Another advantage is that automatic testing of computer programs is considerably simplified, since changes of a GUI need to be updated only in the data and image object database, and not hard-coded in every test. Other advantages are that automatic testing of a computer program can be performed independent of a used platform and that the automatic testing is suitable for maintenance of very large (e.g., thousands of) test suites. Yet another advantage is that a GUI can as well be tested.

BRIEF DESCRIPTION OF THE DRAWINGS

The advantages, objects, and features of the invention will be clear from reading this description in conjunction with the accompanying drawings. Attention is be called to the fact, however, that the following drawings are illustrative only.

FIGS. 4A to 4J illustrate controlling/testing a GUI of a calculator according to exemplary embodiments of the present invention.

DETAILED DESCRIPTION

In the following description, for purposes of explanation and not limitation, specific details are set forth such as particular architectures, scenarios, techniques, etc. in order to provide thorough understanding of the present invention. However, it will be apparent from the following that the present invention can be practiced in other embodiments that depart from these specific details. The exemplary embodiments of the present invention are described herein by way of reference to particular example scenarios. In particular the invention is described in a non-limiting general context in relation to regression testing and to GUI control and/or GUI-based testing in general.

Figure 1:
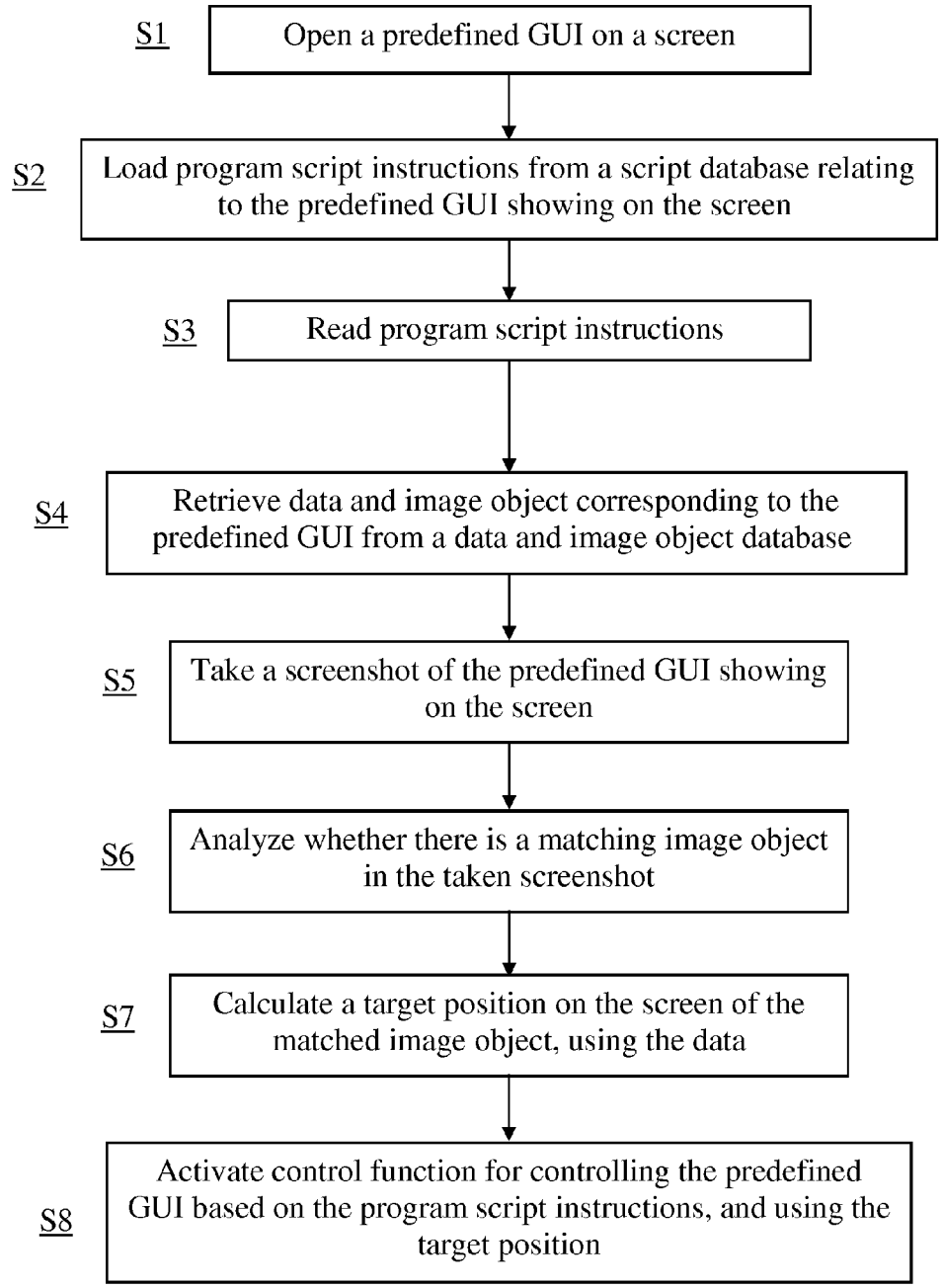
FIG. 1 is a flow chart illustrating a method in a node of automatically testing a computer program according to exemplary embodiments of the present invention.

FIG. 1 is a flow chart illustrating a method in a node of automatically testing a computer program according to an exemplary embodiment of the present invention. As shown, the method comprises (S1) opening a predefined GUI on a device screen. The predefined GUI can be loaded onto the screen upon start-up of the device or upon initiation, i.e., initiation by a user or automatically upon start of a program. The method further comprises (S2) loading program script instructions that can be stored in a script database and that relate to the predefined GUI on the screen, and reading (S3) the program script instructions. Based on the loaded and read program script instructions, data and at least one image object corresponding to the predefined GUI on the screen are retrieved (S4) from a data and image object database.

Each predefined GUI has corresponding data and image object(s) that are captured and stored in advance in the data and image object database. Coded and stored program script instructions are created as relations between each data and image object and one or more predefined GUIs. Thus, a change in a predefined GUI to be controlled needs only an update in the data and image object database defining a changed image object and how it is located. The instructions in the script database are kept unaffected.

Referring back to the method described by FIG. 1, a screenshot including the predefined GUI is taken (S5) and analyzed (S6) to determine whether there is an image object in the taken screenshot that matches a retrieved image object. The screenshot can be seen as a snapshot of the showed screen. After taking the screenshot, a target position is calculated (S7) based on the position of the matching image on the screen and on data retrieved from the data and image object database that relates to the matched image object on the screen. The data retrieved from the data and image object database can comprise position history data and target position data. After calculating the target position, the method according to the FIG. 1 comprises a control function which is activated (S8) for controlling the predefined GUI. The activated control function can include program script instructions that control the predefined GUI based on the target position. For example, the control function can be a mouse click, a double click, a combination of a click and one or more keyboard key-presses, etc. defined in the script being run.

The method illustrated by FIG. 1 can further include reading new program script instructions and automatically performing further functional tests, or further regression tests, on several predefined GUIs. The predefined GUIs can each relate to a regression test or to several regression tests to be automatically run upon initiation. The initiation can further be automatic time-based or automatic occasion-based, e.g., upon a stock trading order being sent.

Figure 2:
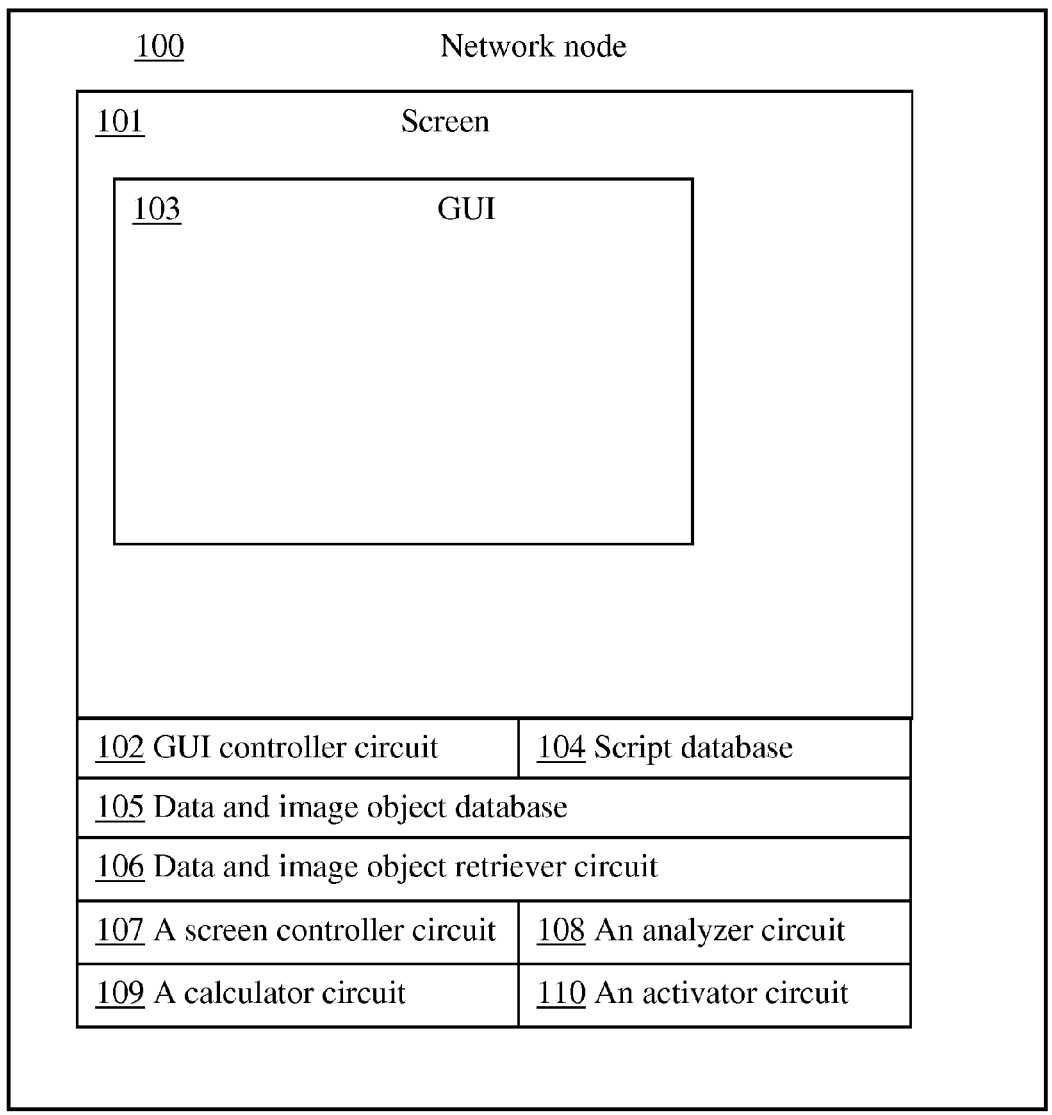
FIG. 2 is a block diagram of a node for automatically testing a computer program according to exemplary embodiments of the present invention.

FIG. 2 is a block diagram illustrating a node 100 for automatically testing a computer program, e.g., a predefined GUI, according to exemplary embodiments of the present invention. The node 100 is adapted to comprise a screen 101, showing a predefined GUI 103, and a GUI controller circuit 102 adapted to find and upload a predefined GUI 103 onto the screen 101. The uploading of a predefined GUI 103 can be performed automatically. As shown in FIG. 2, the node 100 further comprises a script database 104 adapted to store program script instructions which relate to the predefined GUI 103 shown on the screen 101. The program script instructions can relate to one or more predefined GUIs 103, and each predefined GUI 103 can itself relate to, or be used to initiate, one or more regression tests to be performed.

The node 100 further comprises a data and image object database 105 adapted to store data and image object(s) corresponding to the predefined GUI 103 shown on the screen 101; a data and object retriever circuit 106 adapted to retrieve data and at least one image object corresponding to the predefined GUI 103 on the screen 101 from the data and image object database 105; a screen controller circuit 107 adapted to take a screenshot of the predefined GUI 103 on the screen 101; an analyzer circuit 108 adapted to analyze whether there is a matching image object in the taken screenshot, which is to say, an image object that matches a retrieved image object; a calculator circuit 109 adapted to calculate a target position of the matched image object on the screen 101 using data retrieved from the data and image object database; and an activator circuit 110 adapted to activate a control function adapted to control the predefined GUI 103 based on the program script instructions and the target position.

It will be appreciated that one or more of the circuits and databases mentioned in the embodiment above can be parts of an automated GUI test tool, or robot. In addition, the node 100 can be a server computer, a personal computer, a laptop computer, a netbook or other mobile computer, or any other device comprising a computer program with a GUI that needs to be tested or used in testing other functions in the device. The node can be any node of a data network or a wireless network.

The node can further comprise a time comparing circuit (not shown in FIG. 2) that is adapted to start a timer, wait a predetermined time period, add a waited time period to a total passed time period, compare the total passed time period with a threshold, and reset the time comparing circuit upon a condition being fulfilled.

Figure 3:
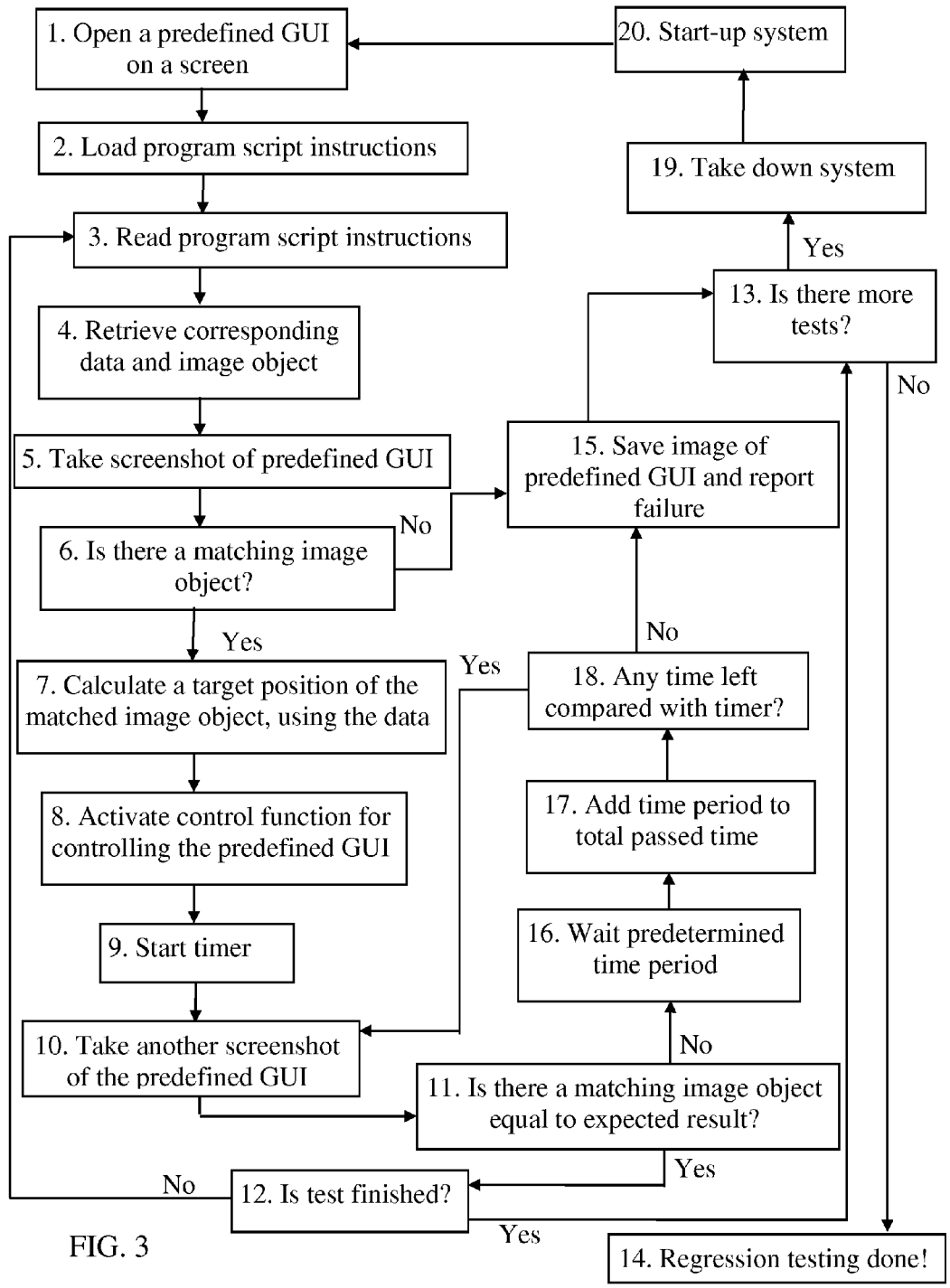
FIG. 3 is a flow chart illustrating a method in a node of automatically regression testing a computer program according to further exemplary embodiments of the present invention.

FIG. 3 is a flow chart illustrating a method in the node 100 of automatically regression testing a computer program, e.g., a predefined GUI, according to further exemplary embodiments of the present invention. The method comprises uploading or opening (1) the predefined GUI 103 on the screen 101. This can be done directly after a node start-up, which it will be noted shall not be considered as limiting the method to being performed only then as it is possible to perform the method at any time. However, performing the method directly after a system start-up makes it more suitable for regression testing and, e.g., when running a large amount of critical tests, since most regression tests are usually performed in non-working hours, i.e., mostly when the node or system is down.

Referring back to FIG. 3, the method further comprises loading (2) one or more program script instructions from the script database 104 and reading (3) the program script instructions; retrieving (4) data and at least one image object corresponding to the predefined GUI 103 from the data and image object database 105; taking (5) a screenshot of the uploaded predefined GUI and analyzing (6) whether there is a matching image object in the taken screenshot, followed by, if Yes, calculating (7) a target position on the screen 101 of the matched image object using retrieved data from the data and image object database; activating (8) a control function for controlling the predefined GUI based on the program script instructions and the calculated target position; starting (9) a timer after further reading of the program script instructions, followed by taking (10) a further screenshot of the predefined GUI 103; analyzing (11) whether there is a matching image object equal to an expected result, which can also be retrieved from the data and image object database 105; if Yes, determining (12) whether the regression test is finished by further reading of the program script instructions; if Yes, determining (13) if there are more regression tests to be performed; and if No, completing (14) the regression testing by displaying at least one result on the screen 101.

It will be noted that all of the method steps mentioned above can be performed automatically, which is to say, without interaction with a human user. The methods and tools can simply be started by a user or according to a schedule or by occurrence of an event. It will also be noted that the program script instructions when read can initiate and control most of the method steps or that a GUI test tool can interwork between or comprise one or more of the mentioned databases. The GUI test tool can also be able to read one or more program script instructions and execute them using information from the data and image object database. The GUI test tool can also be seen as a separate program interface.

The methods described above can further comprise storing information on failed tests (No in 6) and including the stored information in the displayed at least one result. The methods described above can also further comprise saving (15) an image of the predefined GUI that results in a failed test (No in 6), and reporting the failure together with the displayed at least one result, e.g., as a link, or hyperlink. It can then be determined (13) whether there are more regression tests to be performed, and if so (Yes in 13), the node or system can be shut down (19) and re-started (20), and the method can begin again with loading (1) a predefined GUI.

The methods described above can further comprise waiting (16) a predetermined period, after analyzing (11) whether there is a matching image object equal to an expected result; adding (17) the waited time period to a total passed time; determining (18) whether the total passed time exceeds a timing threshold set by the timer; and keep repeating the taking (10) of a further screenshot of the predefined GUI until the analyzing (11) of whether there is a matching image object equal to an expected result is equal to the expected result (Yes in 11) or until the total passed time exceeds the timing threshold (No in 18). Note that this can also be the case when the analyzing (S6 in FIG. 1) results in a mismatch. The method can further include saving (15) an image of the predefined GUI that results in a failed test (No in 6), and reporting the failure together with the displayed at least one result, e.g., as a link, or hyperlink. It can then be determined (13) whether there are more regression tests to be performed, and if so (Yes in 13), the node or system can be shut down (19) and re-started (20), and the method can begin again with loading (1) a predefined GUI.

The methods described above can further comprise resetting all time clocks when the analyzing whether there is a matching image object equal to an expected result matches an object equal to the expected result, or before reporting failure. The methods described above can further comprise using a mouse or keyboard to activate a control function adapted to control the predefined GUI based on the read program script instructions and the calculated target position. The methods described above can further comprise automatically taking down (19) a computer program or a system when the regression test(s) are/is determined to be finished, and can further comprise automatically starting up (20) a computer program or a system when a test is set to start, i.e., time initiation or initiation in response to a certain activity or event.

According to further aspects of the present invention, there is provided a computer program product that when run on a computer causes the computer to perform any of the methods described above.

In the following examples, an automated GUI test tool is used to initiate most of the automatic tests in a node or in a system. The GUI test tool can initiate a regression test based on each computer program GUI by analyzing the GUI showing on a screen. The most fundamental functions of the GUI test tool can be collected in two categories: regression testing a system; and automatically controlling a program to achieve one or more tasks that can be hard or inefficient to control manually. In the regression testing case, the GUI test tool reads one or several program script instructions and according to the program script instructions the tool performs tasks on a GUI that, in many cases, is a predefined GUI (test object). The GUI test tool can further be seen as an interworking interface reading instructions from the script database and making sure that they are performed.

FIGS. 4A to 4J illustrate controlling/testing a GUI of a calculator as an exemplary embodiment of the present invention. An aim of this example is to describe the invention in a simple and non-limiting scenario. Thus, the present invention is used to test a predefined GUI which in this case is a calculating program (i.e., the Windows calculator). This example test is to multiply 2 and 3 and to check whether the result is 6, which is a very simple example of regression testing a computer program by using a GUI representing/relating to the computer program.

Figure 4A:
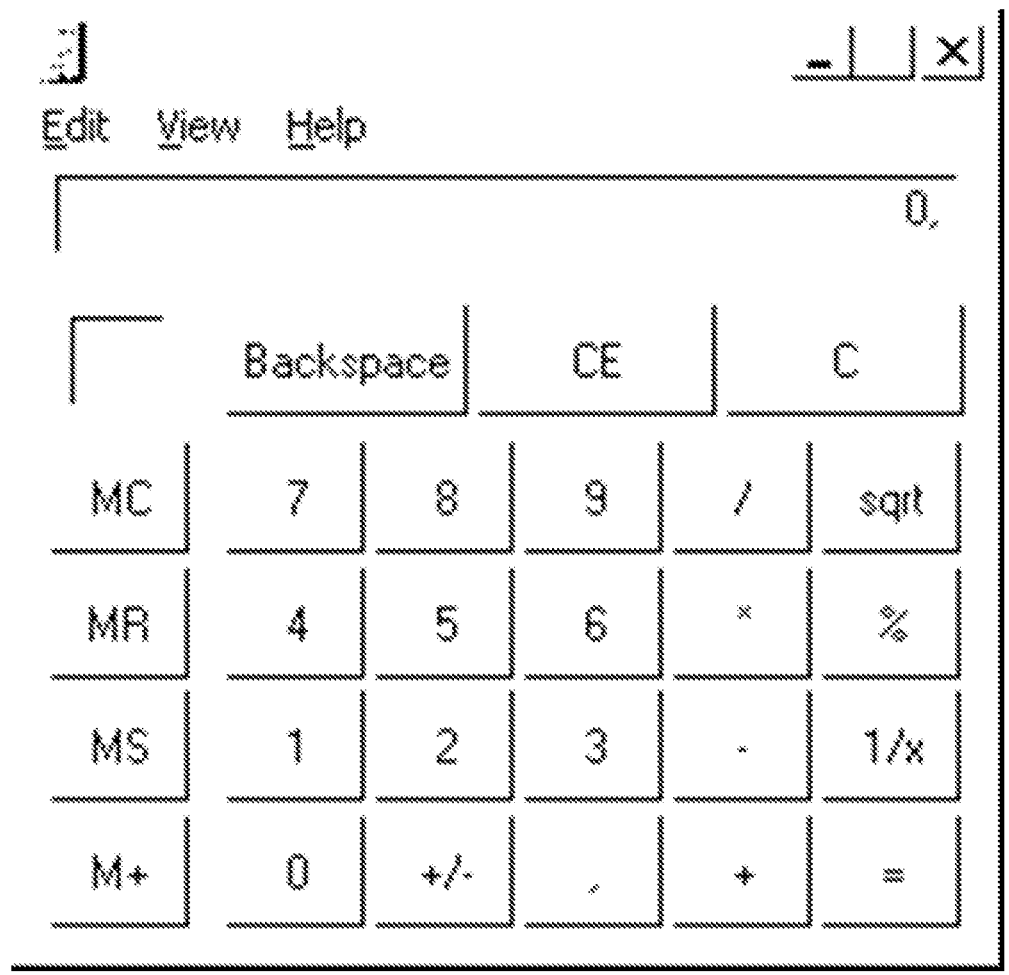

FIG. 4A illustrates a screenshot (screen picture, also sometimes called a snapshot) of a GUI of the calculating program. The GUI test tool can download this picture by initiating a procedure, through reading program script instructions, for taking a screenshot. The tool can further find and isolate the calculator GUI on a screen before starting testing. Finding and isolating the calculator GUI can be accomplished by using two dimensional (2D) image processing, e.g., sliding a window matrix over the screen and searching for a match.

FIGS. 4B to 4J illustrate sub-images of the calculator GUI that are already captured and stored in a data and image object database as data and image objects that are further linked back to the calculator GUI and correspond to respective image objects, e.g. an information pixel matrix describing the image, and to position history data and/target position data. This is done in advance, where a user has targeted/marked and stored each data and/or image object in the data and image object database, and coded/programmed program script instructions setting up a relation and function between each object and the calculator GUI.

Figure 4B:
Figure 4C:
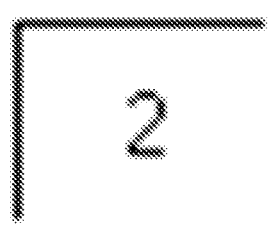

FIG. 4B illustrates a button, the image object "2" in this case, before the button is pressed. FIG. 4C illustrates the button "2" after that the button is initiated, or in this case, pressed. The data retrieved from the data and image object database can comprise the last position on the screen where the image object was positioned, or a relative position of the image object within the calculator GUI. The data retrieved from the data and image object database can further comprise target position data to be used for calculating a target position, on or adjacent to the image object, relative the position of the image object.

FIG. 4D illustrates a button, the image object "*" in this case, before the button is pressed, and FIG. 4E illustrates the button "*" after that the button is initiated, or in this case, pressed. FIG. 4F illustrates a button, the image object "3" in this case, before the button is pressed, and FIG. 4G illustrates the button "3" after that the button is initiated, or in this case, pressed. FIG. 4H illustrates a button, the data image object "=" in this case, before the button is pressed, and FIG. 4I illustrates the button "=" after that button is initiated, or in this case, pressed. FIG. 4J illustrates an expected result of this test. Note that, each image object can be stored and expressed as a 2D pixel matrix (not shown in the figures).

Instructions for the test illustrated by FIGS. 4A to 4I are saved as program script instructions that can look like this:

1. Find and initiate button 2, wait and determine each 10 milliseconds (ms) whether a pressed button shows on the screen, and when the image of the pressed button "2" shows on the screen;

2. Press button "*", wait and determine each 10 ms whether an image of a pressed button shows on the screen, and when the image of the pressed button "*" shows on the screen;

3. Press button "3", wait and determine each 10 ms whether an image of a pressed button shows on the screen, and when the image of the pressed button "3" shows on the screen;

4. Press button "=", wait and determine each 10 ms whether an image of a pressed button shows on the screen, and when the image of the pressed button "=" shows on screen;

5. Check if a shown result matches the stored expected result, wait and analyze each 10 ms, and if there is a match display on screen that test passed (test succeeded or something similar); and, if result is unmatched after a total passed time, display test fail together with unmatched captured result, capturing can be done by taking a screenshot of the result shown on screen. Capturing a picture of a failed test can be used to give information to a user running several tests of which test failed and what the result was.

It will be noted that the GUI test tool reads and performs the above described program script instructions automatically, and that the tool can read program script instructions that the tool should analyze a predefined GUI until a certain condition is initiated on the screen. For example the tool can wait and analyze each 10 ms a predefined GUI until an advertisement pops up and automatically downloads further program script instructions giving the tool the instruction to turn off the advertisement. The test tool can then retrieve data and an image object from the data and image object database for defining and locating the turn-off button.

Figure 5:
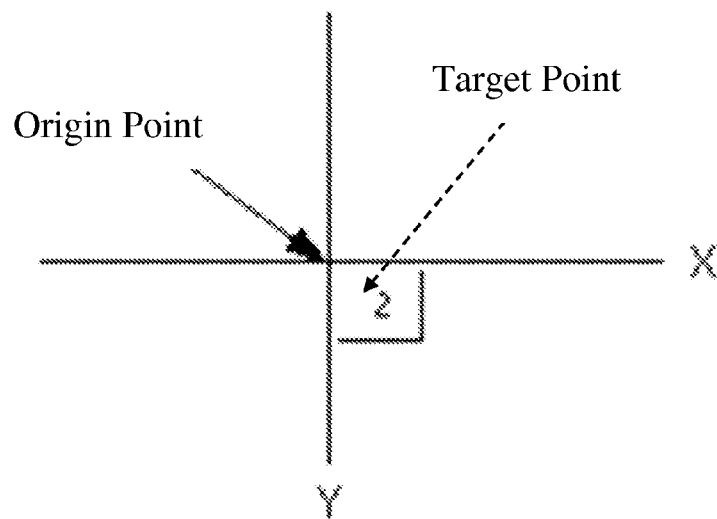
FIG. 5 illustrates targeting data and/or an image object on a screen according to exemplary embodiments of the present invention.

Program script instructions are assigned to every image object, i.e., sub-image. As illustrated by FIG. 5, a program script instruction can further call for a position analyzing device to calculate or determine a point inside or outside an on-screen identified data and/or image object, i.e., a target point. The target point can be set relative to an origin point of an on-screen identified image object, such as the button "2". The target point can then be used by the test tool to initiate further program script instructions relating to that on-screen identified image object. The target position can also be used to target an input field for input of information, e.g., automatic input of a password, or commands.

Figure 6A:
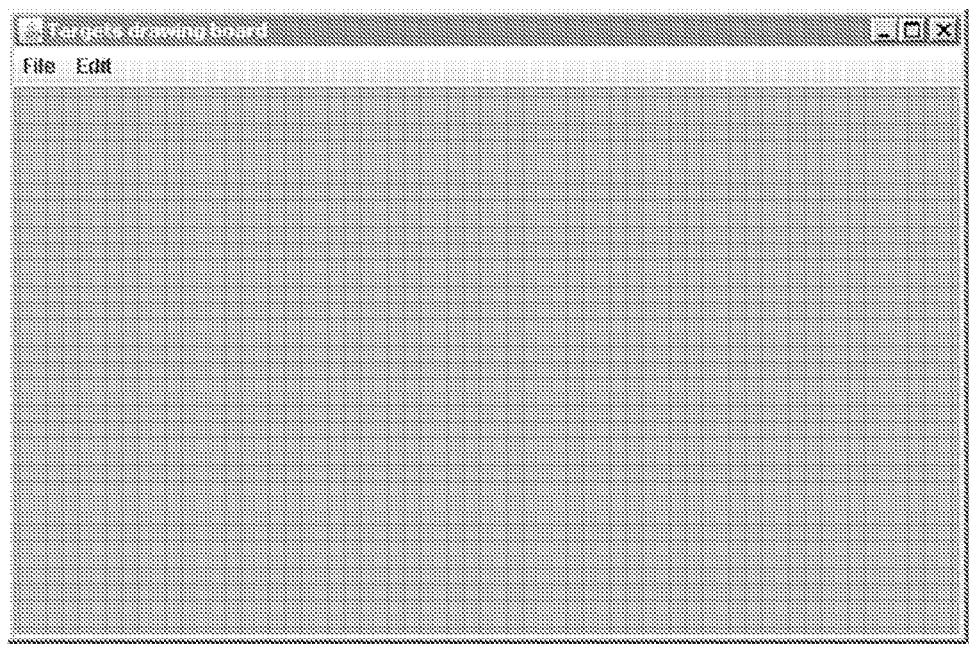
FIGS. 6A to 6I illustrate controlling predefined GUIs according to exemplary embodiments of the present invention.

FIGS. 6A to 6I illustrate another example of capturing and controlling a predefined GUI according to the present invention. The predefined GUI can also be seen as a target GUI. According to FIG. 6A, a targeting interface can be used for targeting data and image object(s) of the predefined GUI. In FIG. 6A, the targeting interface is denoted "Targets drawing board" and is used to track and reveal each position initiated within the targeting interface. The tracked and revealed position is stored as data and linked to each image object in the data and image object database.

Figure 6B:

As illustrated by FIG. 6B, a predefined GUI, in this case "Trading Session"—GUI, is uploaded to the screen and located within the targeting interface.

Figure 6C:

As illustrated by FIG. 6C, a user of the GUI test tool starts a definition by drawing a rectangle around a sub-image of the predefined GUI image object "Trading Session", and the result is illustrated as a marked rectangle (this marked part becomes then an "anchor"). Note, the image object appearance must be unchanged but a location/position of the image object can be changed. The position of the target point relative to the image object together with information identifying the image object are stored as data and image object in the data and image object database. The information identifying the image object can be stored as a 2D pixel matrix, and the position within the targeting interface can be stored as data in the data and image object database.

A user can also create the image called "anchor" programmatically by drawing an image of the object in the computer memory and then using the drawn image as a predefined anchor image. For example, a user can draw the text string "Trading Session" on a gray background in the computer memory.

Figure 6D:
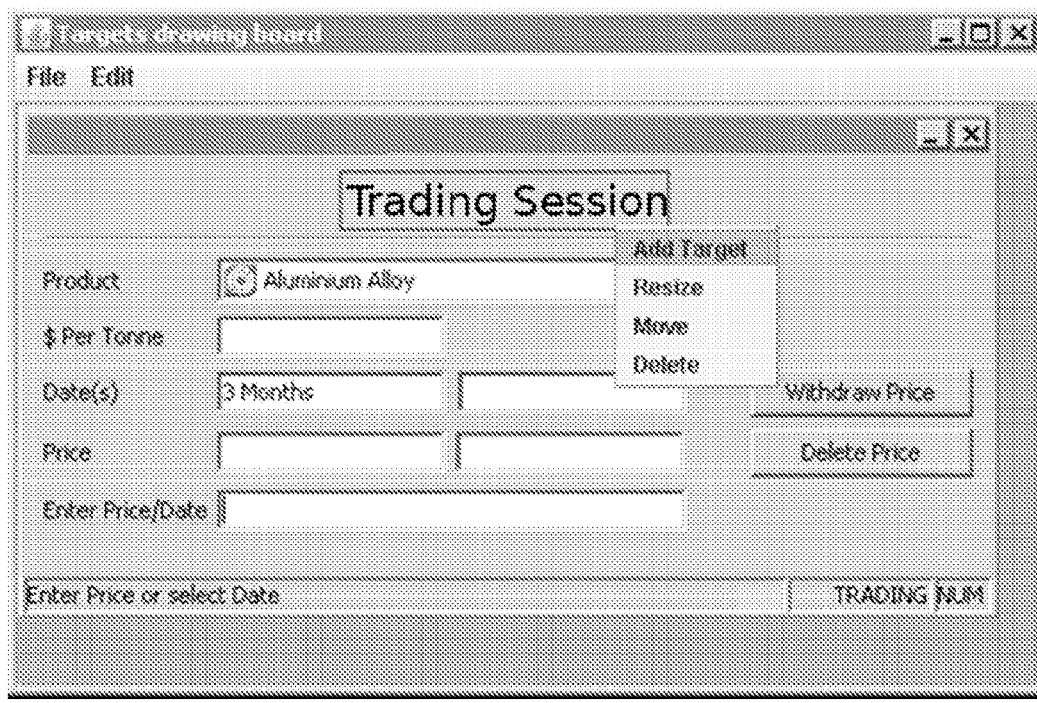

FIG. 6D illustrates how a popup menu pops up, for example, by pressing the right button on a mouse when pointing at the predefined GUI with a marked image object, located inside the targeting interface, i.e., when pointing in the anchor at the predefined GUI (the anchor can be an area in a red rectangle). The user can then use the popup menu to define one or more relations between the image object and a target point on the predefined GUI.

Figure 6E:
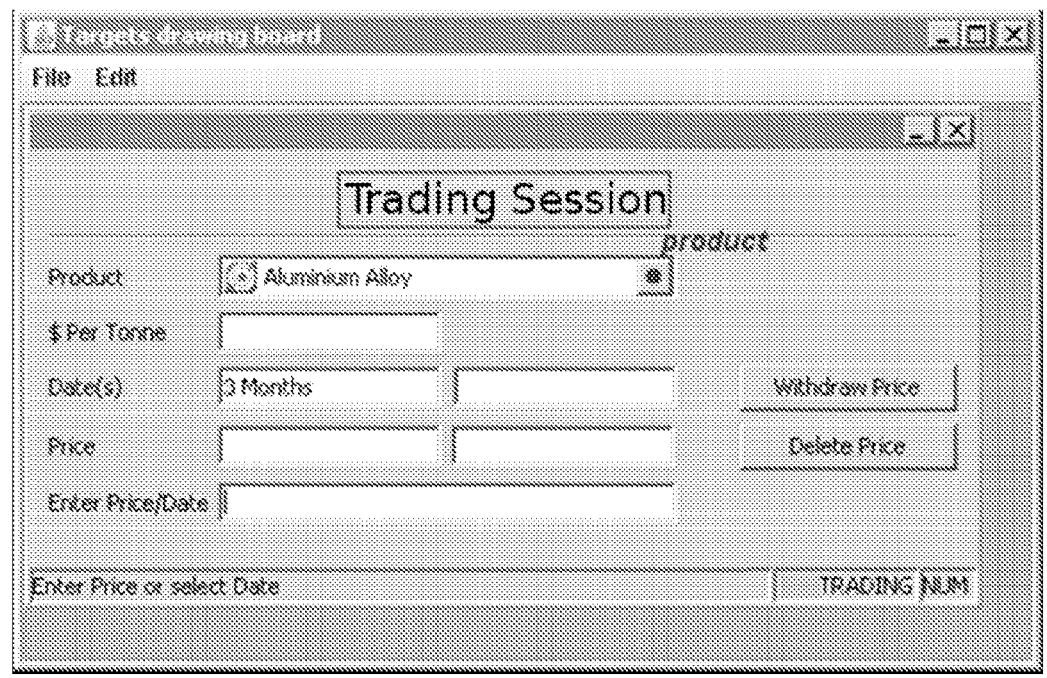
Figure 6F:
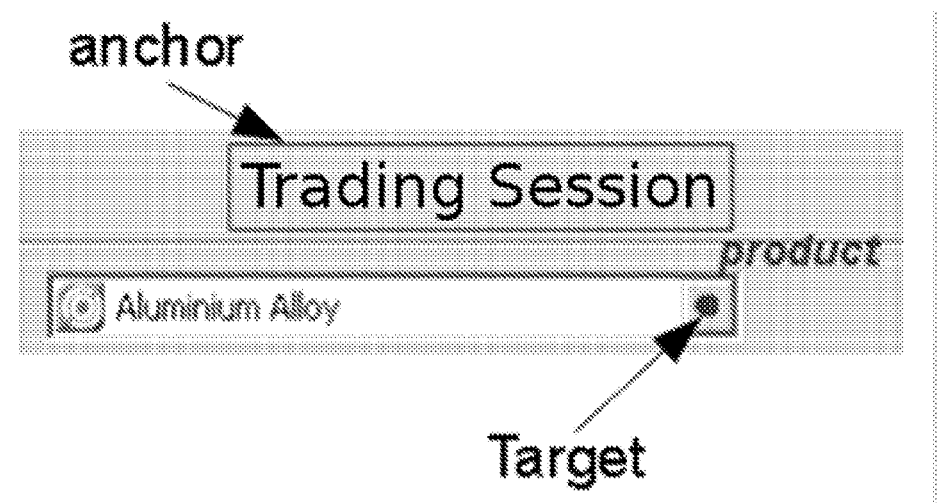

FIGS. 6E, 6F illustrate the target point when the user has selected "Add Target" in the popup menu and selected the target point. The target point can further be defined, e.g., by naming it, in order to be able to use it in program script instructions. The program script instructions are then used to instruct the test tool to perform some actions on that defined target point on the predefined GUI.

Referring to FIG. 6E, the defined point, as illustrated, is named "product" and will be used in program script instructions referred to as "product". This way the test tool can be instructed to click at "product" and the tool will first search for the corresponding image object and use the data retrieved from the data and image object database to locate the target point associated with "product". The tool can also perform an action associated with "product". The data retrieved from the data and image object database can comprise information data on where and how to find the image object, and/or information data on how to calculate the target point. The target point can be separately linked to the image object, meaning that the information data can be to click five pixel rows, two pixel columns, from the image object.

FIG. 6F illustrates a relation of the image object with a target point. The image object can be set to be the anchor point and "product" can be selected as the target point. The image object can further be analyzed for determining if a change has occurred, i.e., by a matching procedure towards the stored image object. If the image object has been moved, then the relation can need to be updated.

If the test tool does not find the image object on the screen, the tool then displays an error message.

Figure 6G:
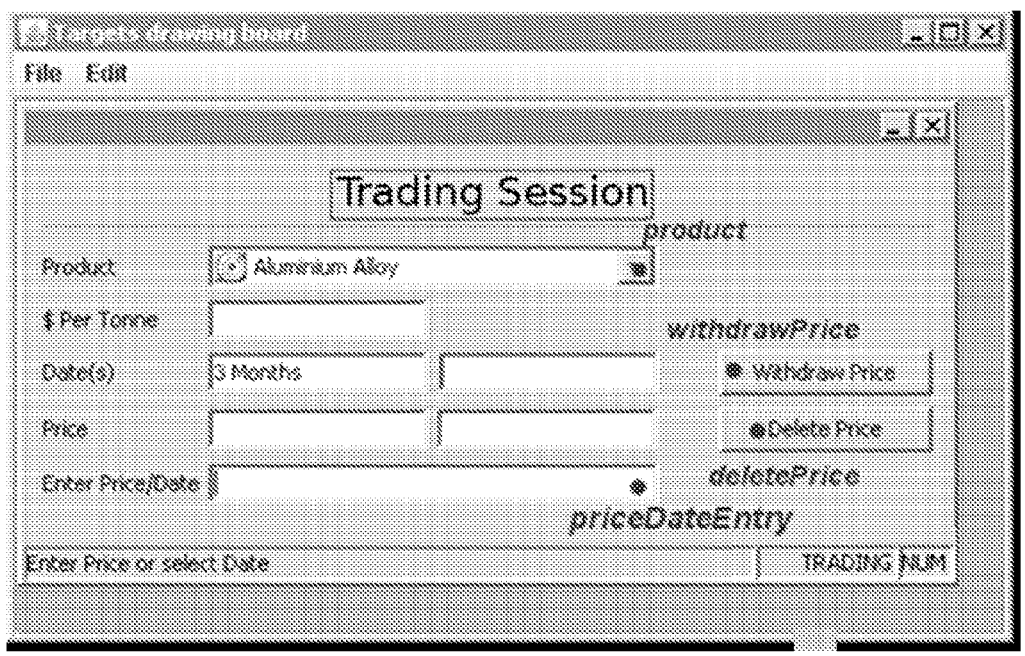

The user can then continue to define target points and further associate the target points with different actions by using program script instructions. FIG. 6G illustrates a predefined GUI with 4 target points (product, withdrawPrice, deletePrice, and priceDateEntry) selected.

Figure 6H:
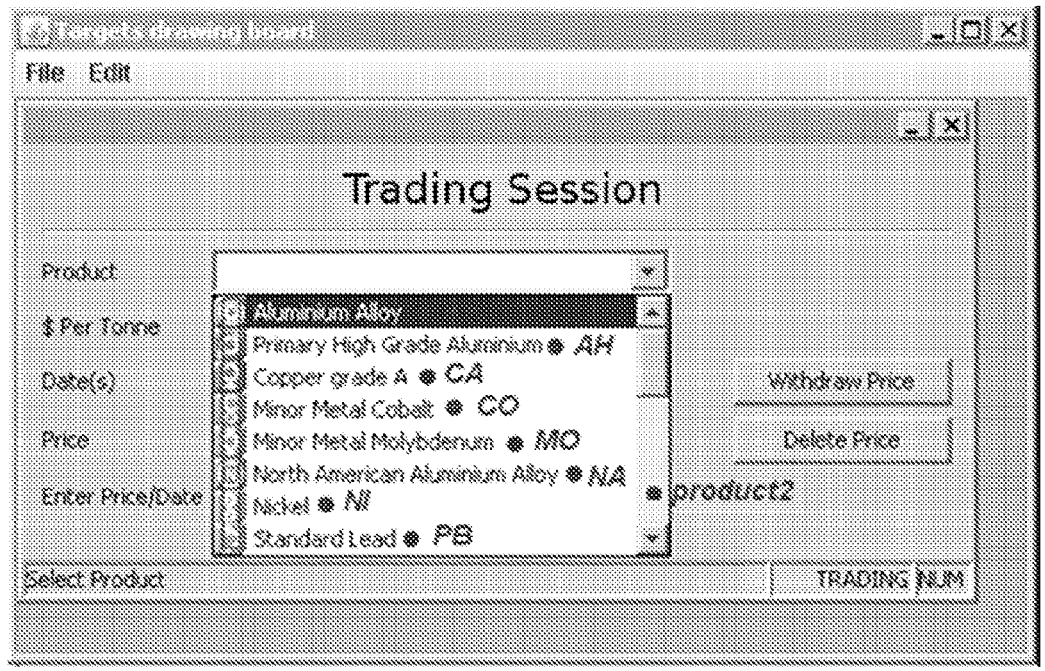

FIG. 6H illustrates a predefined GUI with 8 target points (product2, AH, CA, CO, MO, NA, NI, PB) and one anchor point (Trading Session) selected.

Figure 6I:
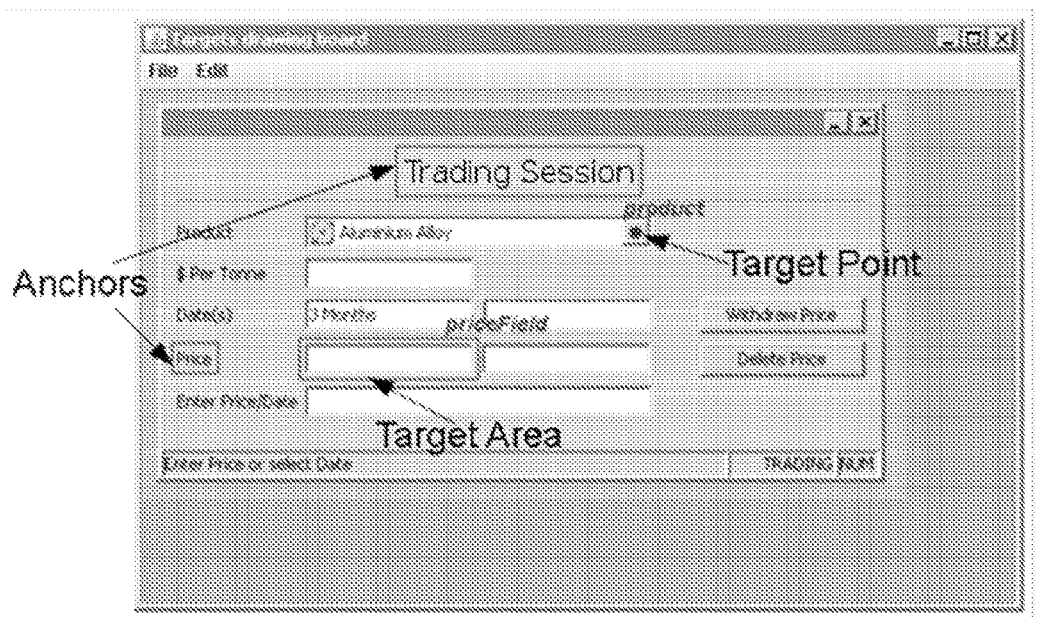

FIG. 6I illustrates a predefined GUI with two anchor points (Trading Session, Price), two target points (product, priceField), and one target area, or target field. The target field can be used for input instructions. A target point in the target field can also be selected and when initiated, the target point directs the input to a certain location/position in the target field.

Whenever the test tool wants to find a target point, the tool takes a screenshot of the predefined GUI and retrieves a data and image object from a data and image object database associated with an image object to be used for calculating the target point. The data retrieved can include corresponding anchor point and information data on how to calculate the target point based on the anchor point. The coordinates of the target point can be set to always be constant relative to a targeted image object. This way, by finding a matched image object on the predefined GUI, then the target point always can be found using the matched image object, as anchor, unless a change in the GUI of the relation them between has occurred.

For an example of how to find coordinates of an image object in a predefined GUI, let an image object called A, which is the "Trading Session" as in FIG. 6C, be found in an image called B, which is the predefined GUI. In finding out coordinates of image A in B the predefined GUI, the image B is split into as many temporary image objects as possible with the same width and height as A. In other words, B is split into one or more A-size pixel matrixes. Every temporary image object can then be matched with A until a match is determined. This matching procedure requires that all image objects must be matched until a match is detected. Since every pixel in B can be the first pixel of the image object, all pixels in B are compared with every pixel in the image object A.

Going through all the image objects takes lots of time and the time must be reduced. Thus, we need to discard the mismatching sub-images as soon as possible. There are many ways on how to reduce the time for matching image objects. Two ways are therefore here suggested to reduce the time, which can be used separately or in combination.

1) There are lots of pixels with same color as the background and the probability to find two mismatching pixels are low in the start of the search. Thus, instead of starting from pixel 1 and continuing to the last pixel, start by checking pixels with colors different from the background color and go on as long as the pixels match each other until all pixels have been checked.

2) To reduce the time further, the test tool saves the last location of the matching image object. Next time when the tool needs to search for the same image object, it checks the saved location first. In most cases the matching image appears at the same position and thus it will be found immediately.

The examples above are given in order to explain and not restrict the present invention. For example, the present invention can be embodied in lowering the sound of a music program that includes advertising sometimes when the advertising is sent; playing a game to initially reach a higher level; and integrating several programs by analyzing their GUIs. It will be noted that program script instructions can be written in any suitable programming language, such as JAVA, JAVA SCRIPT, C++, etc.

It will be appreciated that methods described above can be carried out repetitively as necessary, for example, to respond to changes in software programs and systems. Assemblies implementing this invention can be included in, for example, computers, servers, wireless communication network nodes, and the like.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), and an erasable programmable read-only memory (EPROM or Flash memory).

Thus, the invention may be embodied in many different forms, not all of which are described above. The particular embodiments described above are merely illustrative and should not be considered restrictive in any way. It is contemplated that alternatives, modifications, permutations, and equivalents thereof will become apparent upon reading this description and the drawings. The scope of the invention is determined by the following claims, and all variations and equivalents that fall within the range of the claims are intended to be embraced therein.

It is emphasized that the terms "comprises" and "comprising", when used in this application, specify the presence of stated features, integers, steps, or components and do not preclude the presence or addition of one or more other features, integers, steps, components, or groups thereof.

What is claimed is:

1. A method in a computer of automatically repetitively testing a computer program, comprising:
opening a predefined graphical user interface (GUI) on a screen of the computer;
loading a set of program script instructions from a script database in communication with the computer, wherein the set is associated with the predefined GUI;
reading a loaded set of program script instructions;

retrieving, based on the loaded set, data and at least one image object corresponding to the predefined GUI from a data and image object database in communication with the computer;

taking a screenshot of the predefined GUI, wherein the screenshot includes at least one image object of the predefined GUI;

determining whether an image object in the screen shot matches an image object retrieved from the data and object image database;

if a screen shot image object matches a retrieved image object:

determining a target position on the screen of the matching image object based on data retrieved from the data and image object database; and activating a control function adapted to control the predefined GUI based on the loaded set of program script instructions and the target position;

wherein either at least one program script instruction in the loaded set is a relation between a respective data and image object and a respective plurality of predefined GUIs, or at least one image object retrieved is generated programmatically based on stored data in response to a respective program script instruction in the loaded set, or both; the data and at least one image object corresponding to the predefined GUI retrieved are used a plurality of times in determining whether an image object matches a retrieved image object and determining a target position based on data retrieved; and data retrieved comprises position history data and target position data of the matching image object.

2. The method of claim 1, wherein the predefined GUI is opened upon starting the computer program.

3. The method of claim 1, wherein the program script instructions are relations between the predefined GUI and data and image objects in the data and image object database.

4. The method of claim 1, wherein changing the predefined GUI corresponds to changing at least one image object and how it is located without changing the set of program script instructions.

5. The method of claim 1, further comprising reading a new set of program script instructions, and automatically testing a new predefined GUI.

6. The method of claim 1, further comprising (a) taking a further screenshot of the predefined GUI, and (b) determining whether an image object in the further screen shot corresponds to an expected image object.

7. The method of claim 6, further comprising (c) waiting a predetermined period after determining whether the image object in the further screen shot corresponds to the expected image object; (d) adding the predetermined time period to a total passed time period; (e) determining whether the total passed time period exceeds a threshold; and (f) repeating (a) through (e) until either the total passed time exceeds the threshold or it is determined that an image object in a further screen shot corresponds to the expected object.

8. A computing node for automatically repetitively testing a computer program having a predefined graphical user interface (GUI), comprising:
    a screen;
    a GUI controller circuit adapted to find and load the predefined GUI onto the screen;
    a script database adapted to store a set of program script instructions associated with the predefined GUI;
    a data and image object database adapted to store data and at least one image object corresponding to the predefined GUI;
    a data and object retriever circuit adapted to retrieve data and at least one image object corresponding to the predefined GUI from the data and image object database;
    a screen controller circuit adapted to take a screenshot of the predefined GUI, wherein the screenshot includes at least one image object of the predefined GUI;
    an analyzer circuit adapted to determine whether an image object in the screenshot matches an image object retrieved from the data and object image database based on the set of program script instructions;
    a calculator circuit adapted to calculate a target position on the screen of an image object in the screenshot that matches a retrieved image object based on data retrieved from the data and image object database; and
    an activator circuit adapted to activate a control function to control the predefined GUI based on the set of program script instructions and the target position;
    wherein either at least one program script instruction in the set is a relation between a respective data and image object and a respective plurality of predefined GUIs, or at least one image object retrieved is generated programmatically based on stored data in response to a respective program script instruction in the set, or both; the data and at least one image object corresponding to the predefined GUI retrieved are used a plurality of times by the analyzer circuit and the calculator circuit in determining whether an image object matches a retrieved image object and calculating a target position based on data retrieved; and data retrieved by the data and object retriever circuit comprises position history data and target position data of the matching image object.

9. The node of claim 8, wherein the GUI controller circuit is adapted to find and upload the predefined GUI upon starting the computer program.

10. The node of claim 8, wherein the program script instructions are relations between the predefined GUI and data and image objects in the data and image object database.

11. The node of claim 8, wherein changing the predefined GUI corresponds to changing at least one image object and how it is located without changing the set of program script instructions.

12. The node of claim 8, wherein the screen controller circuit is further adapted to take a further screenshot of the predefined GUI, and the analyzer circuit is further adapted to determine whether an image object in the further screen shot corresponds to an expected image object.

13. A non-transitory computer-readable medium having stored instructions that, when executed by a computer, cause the computer to perform a method of automatically repetitively testing a computer program, wherein the method comprises:
    opening a predefined graphical user interface (GUI) on a screen of the computer;
    loading a set of program script instructions from a script database in communication with the computer, wherein the set is associated with the predefined GUI;
    reading a loaded set of program script instructions;
    retrieving, based on the loaded set, data and at least one image object corresponding to the predefined GUI from a data and image object database in communication with the computer;
    taking a screenshot of the predefined GUI, wherein the screenshot includes at least one image object of the predefined GUI;
    determining whether an image object in the screen shot matches an image object retrieved from the data and object image database;

if a screen shot image object matches a retrieved image object:

determining a target position on the screen of the matching image object based on data retrieved from the data and image object database; and activating a control function adapted to control the predefined GUI based on the loaded set of program script instructions and the target position;

wherein either at least one program script instruction in the loaded set is a relation between a respective data and image object and a respective plurality of predefined GUIs, or at least one image object retrieved is generated programmatically based on stored data in response to a respective program script instruction in the loaded set, or both; the data and at least one image object corresponding to the predefined GUI retrieved are used a plurality of times in determining whether an image object matches a retrieved image object and determining a target position based on data retrieved; and data retrieved comprises position history data and target position data of the matching image object.

14. The non-transitory medium of claim 13, wherein the predefined GUI is opened upon starting the computer program.

15. The non-transitory medium of claim 13, wherein the program script instructions are relations between the predefined GUI and data and image objects in the data and image object database.

16. The non-transitory medium of claim 13, wherein changing the predefined GUI corresponds to changing at least one image object and how it is located without changing the set of program script instructions.

17. The non-transitory medium of claim 13, wherein the method further comprises reading a new set of program script instructions, and automatically testing a new predefined GUI.

18. The non-transitory medium of claim 13, wherein the method further comprises (a) taking a further screenshot of the predefined GUI, and (b) determining whether an image object in the further screen shot corresponds to an expected image object.

19. The non-transitory medium of claim 18, wherein the method further comprises (c) waiting a predetermined period after determining whether the image object in the further screen shot corresponds to the expected image object; (d) adding the predetermined time period to a total passed time period; (e) determining whether the total passed time period exceeds a threshold; and (f) repeating (a) through (e) until either the total passed time exceeds the threshold or it is determined that an image object in a further screen shot corresponds to the expected object.

* * * * *